United States Patent
Zheng et al.

(10) Patent No.: US 11,812,281 B2
(45) Date of Patent: Nov. 7, 2023

(54) MEASURING METHOD, TERMINAL AND NETWORK SIDE DEVICE

(71) Applicant: VIVO MOBILE COMMUNICATION CO., LTD., Chang'an Dongguan (CN)

(72) Inventors: Qian Zheng, Chang'an Dongguan (CN); Xiaodong Yang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/039,399

(22) Filed: Sep. 30, 2020

(65) Prior Publication Data
US 2021/0014704 A1    Jan. 14, 2021

Related U.S. Application Data

(63) Continuation of application No. PCT/CN2019/081255, filed on Apr. 3, 2019.

(30) Foreign Application Priority Data

Apr. 4, 2018 (CN) .......................... 201810302201.5

(51) Int. Cl.
*H04W 24/02* (2009.01)
*H04W 48/10* (2009.01)

(52) U.S. Cl.
CPC ........... *H04W 24/02* (2013.01); *H04W 48/10* (2013.01)

(58) Field of Classification Search
CPC ........ H04L 5/00; H04L 5/0098; H04W 24/02; H04W 24/10; H04W 48/10; H04W 48/12; H04W 76/27
See application file for complete search history.

(56) References Cited

U.S. PATENT DOCUMENTS

| | | | | |
|---|---|---|---|---|
| 9,602,269 B2 * | 3/2017 | Wei | ........................ | H04L 5/1469 |
| 10,433,330 B2 * | 10/2019 | Vajapeyam | ........... | H04W 56/00 |
| 10,841,941 B2 * | 11/2020 | Vajapeyam | ........... | H04L 5/0085 |
| 11,419,024 B2 * | 8/2022 | Ahmavaara | ....... | H04W 36/0066 |
| 11,432,178 B2 * | 8/2022 | Dalsgaard | ............. | H04W 72/51 |

(Continued)

FOREIGN PATENT DOCUMENTS

| CN | 106465336 A | 2/2017 |
|---|---|---|
| CN | 107295558 A | 10/2017 |

(Continued)

OTHER PUBLICATIONS

Extended European Search Report for related Application No. 19781422,1; reported on Apr. 26, 2021.

KT Corp., "Idle mode measurement reporting for fast SCell set-up", Oct. 9-13, 2017, 3GPP TSG-RAN WG2 #99bis, Prague, Czech Republic.

(Continued)

*Primary Examiner* — Khawar Iqbal
(74) *Attorney, Agent, or Firm* — von Briesen & Roper, s.c.

(57) ABSTRACT

A measurement method, a terminal, and a network-side device are provided. The method applied to a terminal side includes: acquiring first system information sent by a network-side device in a case that the terminal is in a non-connected state; performing a corresponding measurement operation according to the first system information. In the present disclosure, through first system information, the terminal in a non-connected state is enabled to determine and perform a corresponding measurement operation according to the first system information.

16 Claims, 5 Drawing Sheets

(56) References Cited

U.S. PATENT DOCUMENTS

| | | | |
|---|---|---|---|
| 2014/0334353 A1* | 11/2014 | Wei | H04W 72/1263 370/280 |
| 2015/0289208 A1 | 10/2015 | Liu et al. | |
| 2016/0192291 A1 | 6/2016 | Dalsgaard et al. | |
| 2016/0212752 A1 | 7/2016 | Xu et al. | |
| 2019/0037425 A1 | 1/2019 | Hong et al. | |
| 2019/0098670 A1* | 3/2019 | Jia | H04W 74/00 |
| 2019/0116585 A1* | 4/2019 | Chakraborty | H04W 52/0235 |
| 2019/0141578 A1* | 5/2019 | Tang | H04W 28/18 |
| 2019/0190682 A1* | 6/2019 | Kadiri | H04W 72/0453 |
| 2019/0289532 A1* | 9/2019 | Yi | H04L 1/1614 |
| 2019/0306908 A1* | 10/2019 | Hahn | H04W 76/38 |
| 2019/0373626 A1* | 12/2019 | Vajapeyam | H04W 72/21 |
| 2020/0187103 A1* | 6/2020 | Justin | G06F 3/02 |
| 2020/0280337 A1* | 9/2020 | Yi | H04L 5/001 |
| 2021/0037594 A1* | 2/2021 | Dalsgaard | H04W 76/34 |
| 2021/0075473 A1* | 3/2021 | Kim | H04B 7/088 |
| 2021/0105709 A1* | 4/2021 | Ryan | G06F 18/231 |
| 2021/0235388 A1* | 7/2021 | Jeon | H04W 52/325 |
| 2021/0297887 A1* | 9/2021 | Kim | H04W 76/27 |

FOREIGN PATENT DOCUMENTS

| | | |
|---|---|---|
| CN | 109309969 A | 2/2019 |
| EP | 3796698 A1 | 3/2021 |
| WO | 2015035841 A1 | 3/2015 |

OTHER PUBLICATIONS

Nokia, Nokia Shaghai Bell, "Faster idle mode measurements", Oct. 9-13, 2017, 3GPP TSG-RAN WG2 #99bls, Prague, Czech Republic.
International Search Report & Written Opinion related to Application No. PCT/CN2019/081255; reported on Oct. 15, 2020.
Oppo, "Discussion on Measurement Mechanism for Fast SCell Configuration", Feb. 26-Mar. 2, 2018, 3GPP TSG-RAN WG2#101, Athens, Greece.
Hisilicon Huawei, "Discussion on the details of idle mode measurements", Feb. 26-Mar. 2, 2018, 3GPP 3GPP TSG-RAN WG2 Meeting #101, Athens, Greece.
Japanese Notice of Reasons for Refusal for related Application No. 2020-554067; reported on Nov. 16, 2021.
Nokia, Nokia Shanghai Bell, "Structure and Content of Remaining Minimum SI", Oct. 9-13, 2017, 3GPP TSG-RAN WG2 #99bis, Prague, Czech Republic, R2-1711587.
Qualcomm Incorporated, "Fast SCell Configuration through Quick SCell Measurement Reporting", Feb. 26-Mar. 2, 2018, 3GPP TSG-RAN2 Meeting #101, Athens, Greece, R2-1802073.
European Office Action related to Application No. 19781422.1 dated Jan. 18, 2023.
3GPP TS 38.331 V15.1.0 3rd Generation Partnership Project; Technical Specification Group Radio Access Network; NR; Radio Resource Control (RRC) protocol specification; (Release 15) V15.1.0 (Mar. 2018).

* cited by examiner

MEASURING METHOD, TERMINAL AND NETWORK SIDE DEVICE

CROSS-REFERENCE TO RELATED APPLICATION

This patent application is a bypass continuation under 35 U.S.C. § 111 of PCT Application No. PCT/CN2019/081255 filed on Apr. 3, 2019, which claims a priority to a Chinese patent application No. 201810302201.5 filed in China on Apr. 4, 2018, which is incorporated herein by reference in its entirety.

TECHNICAL FIELD

The present disclosure relates to the field of communications technology, and in particular, relates to a measurement method, a terminal and a network-side device.

BACKGROUND

Carrier aggregation (Carrier Aggregation, CA) technology has been introduced in along term evolution (Long Term Evolution, LTE) system. In the carrier aggregation technology, a single terminal may communicate and connect to a network through multiple cells. One of the cells is a primary cell (Primary Cell, PCell) and the other cells are secondary cells (Secondary Cell, SCell). The SCell has two states, i.e., an activated state and a deactivated state, and the PCell remains in the activated state all the time.

A function of fast carrier activation or deactivation (fast SCell activation or deactivation) is also introduced in the LTE system. An approach for fast carrier activation or deactivation in LTE is as follows: a network-side device indicates, in a system information block type 5 (System Information Block Type 5, SIB5), a frequency that a terminal needs to measure in an idle state (idle state), and after the terminal enters a connected state (Connected state), the terminal immediately reports that a measurement result is available; the terminal reports the measurement result in a case that the network-side device requires the terminal to report the measurement result. In this way, the network-side device may quickly configure and activate a carrier (Carrier) or a secondary cell (Secondary Cell, SCell) based on the measurement result reported by the terminal. The above process is also called a method of enhancing LTE CA utilization (Enhancing LTE CA utilization).

In 5G New Radio (5th-Generation New Radio, 5G NR) systems, system information is divided into two categories, one category is minimum system information (Minimum SI, MSI), and the other category is other system information (other SI). The MSI includes a master information block (Master Information Block, MIB) and system information block type 1 (System Information Block Type 1, SIB1), which the network-side device directly broadcasts to the UE. For other SI including SIB2, SIB3, SIB4, SIB5, etc., only after the terminal sends a request for acquiring related other SI to the network-side device, the network-side device then sends the other SI requested by the terminal to the terminal. Therefore, this type of system information is also called system information based on request (On demand SI). Since a broadcast mechanism and content of system information for other SI in the 5G NR system are different from those in the LTE system, the approach for fast carrier activation or deactivation in the LTE system may not be applied to the 5G NR system.

It may be seen that in related art, communication systems such as 5G NR may not perform fast cell activation or deactivation, resulting in poor communication performance of communication systems such as 5G NR.

SUMMARY

Embodiment of the present disclosure provide a measurement method, a terminal, and a network-side device, so as to solve a problem that communication performance of communication systems are poor due to inability to perform fast cell activation or deactivation.

In order to address the technical problem described above, the present disclosure is implemented as follows.

In a first aspect, an embodiment of the present disclosure provides a measurement method, and the method is applied to a terminal and includes: acquiring first system information sent by a network-side device in a case that the terminal is in a non-connected state; performing a corresponding measurement operation according to the first system information; wherein the first system information is used for at least one of: indicating whether a cell supports a function of fast activation or deactivation; indicating whether the network-side device broadcasts second system information, wherein the second system information is used to configure measurement information of fast activation or deactivation; indicating whether third system information includes measurement information of fast activation or deactivation, and indicating whether the network-side device broadcasts the third system information.

In a second aspect, an embodiment of the present disclosure provides a measurement method, and the method is applied to a network-side device and includes: sending first system information to a terminal in a non-connected state, to enable the terminal to execute a corresponding measurement operation according to the first system information; wherein the first system information is used for at least one of: indicating whether a cell supports a function of fast activation or deactivation; indicating whether the network-side device broadcasts second system information, wherein the second system information is used to configure measurement information of fast activation or deactivation; indicating whether third system information includes measurement information of fast activation or deactivation, and indicating whether the network-side device broadcasts the third system information.

In a third aspect, an embodiment of the present disclosure provides a terminal, and the terminal includes: an acquisition module, used to acquire first system information sent by a network-side device in a case that the terminal is in a non-connected state; a performing module, used to perform a corresponding measurement operation according to the first system information; wherein the first system information is used for at least one of: indicating whether a cell supports a function of fast activation or deactivation; indicating whether the network-side device broadcasts second system information, wherein the second system information is used to configure measurement information of fast activation or deactivation; indicating whether third system information includes measurement information of fast activation or deactivation, and indicating whether the network-side device broadcasts the third system information.

In a fourth aspect, an embodiment of the present disclosure provides a network-side device, and the network-side device includes: a sending module, used to send first system information to a terminal in a non-connected state, to enable the terminal to perform a corresponding measurement operation according to the first system information; wherein the first system information is used for at least one of: indicating whether a cell supports a function of fast activation or deactivation; indicating whether the network-side device broadcasts second system information, wherein the second system information is used to configure measurement information of fast activation or deactivation; indicating whether third system information includes measurement information of fast activation or deactivation, and indicating whether the network-side device broadcasts the third system information.

In a fifth aspect, an embodiment of the present disclosure provides a terminal, and the terminal includes: a storage, a processor, and a computer program stored on the storage and executable by the processor, wherein in a case that the computer program is executed by the processor, the processor implements steps of the measurement method corresponding to the terminal provided in the embodiments of the present disclosure.

In a sixth aspect, an embodiment of the present disclosure provides a network-side device, and the network-side device includes: a storage, a processor, and a computer program stored on the storage and executable by the processor, wherein in a case that the computer program is executed by the processor, the processor implements steps of the measurement method corresponding to the network-side device provided in the embodiments of the present disclosure.

In a seventh aspect, an embodiment of the present disclosure provides a computer readable storage medium, wherein a computer program is stored on the computer readable storage medium, and when the computer program is executed by a processor, the processor implements steps of the measurement method corresponding to the terminal provided in the embodiments of the present disclosure, or implements steps of the measurement method corresponding to the network-side device provided in the embodiments of the present disclosure.

According to the embodiments of the present disclosure, a network-side device broadcasts first system information directly to a terminal, thus enabling the terminal in a non-connected state to determine and execute a corresponding measurement operation according to the first system information. Since the terminal in the non-connected state may perform the measurement operation, and report to the network-side device a measurement result in the non-connected state for configuring fast activation or deactivation, therefore the communication performance of the communication system may be improved.

BRIEF DESCRIPTION OF THE DRAWINGS

In order to more clearly illustrate technical solutions in embodiments of the present disclosure, drawings used in description of the embodiments of the present disclosure will be briefly introduced below. Obviously, the drawings in the following description are only some embodiments of the present disclosure. Based on these drawings, other drawings may be obtained by those skilled in the art without any creative work.

DETAILED DESCRIPTION

The technical solutions of embodiments of the present disclosure will be clearly and completely described below with reference to the drawings of embodiments of the present disclosure. Apparently, the described embodiments are some of the embodiments of the present disclosure, but are not all of the embodiments. Based on embodiments of the present disclosure, all other embodiments derived by a person of ordinary skill in the art without any creative effort shall fall within the protection scope of the present disclosure.

Figure 1:
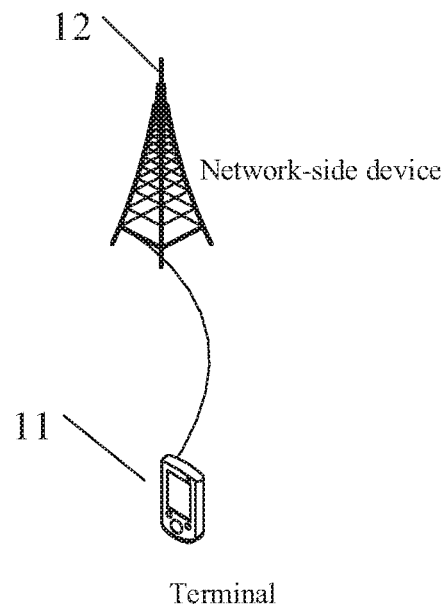
FIG. 1 is a structural diagram of a measurement system provided in an embodiment of the present disclosure.

FIG. 1 is a structural diagram of a measurement system provided in an embodiment of the present disclosure. As shown in FIG. 1, a terminal (User Equipment, UE) 11 and a network-side device 12 are included. The terminal 11 may be a mobile communication terminal, such as a mobile phone, a tablet personal computer (Tablet Personal Computer), a laptop computer (Laptop Computer), a personal digital assistant (personal digital assistant, PDA), a mobile internet device (Mobile Internet Device, MID), or a wearable device (Wearable Device) and other terminal-side devices. It should be noted that a specific type of the terminal 11 is not limited in the embodiments of the present disclosure. The network-side device 12 may be a 5G network-side device (e.g., gNB, 5G NR NB), or a 4G network-side device (e.g., eNB), or a 3G network-side device (e.g., NB), etc., and it should be noted that a specific type of the network-side device 12 is not limited in an embodiment of the present disclosure.

In an embodiment of the present disclosure, the terminal acquires first system information sent by a network-side device in a case that the terminal is in a non-connected state; the terminal executes a corresponding measurement behavior according to the first system information; where the first system information is used for at least one of following: indicating whether a cell supports a function of fast activation or deactivation; indicating whether the network-side device broadcasts second system information, where the second system information is used for configuring measurement information of fast activation or deactivation; indicating whether third system information includes measurement information of fast activation or deactivation; and indicating whether the network-side device broadcasts the third system information.

In an eLTE system and a 5G NR system, in addition to a Connected state and an idle state, an independent radio resource control (Radio Resource Control, RRC) state is also introduced, which is called an inactive state (inactive state). Here, the idle state and the inactive state may be called a non-connected state. Therefore, an embodiment of the present disclosure may be applicable to a terminal in the idle state or the inactive state in the eLTE system or the 5G NR system.

In an embodiment of the present disclosure, fast activation or deactivation may refer to fast carrier activation or deactivation applicable to the eLTE system or the 5G NR system, or SCell fast activation or deactivation applicable to the eLTE system or the 5G NR system, or bandwidth part (Bandwidth Part, BWP) fast activation or deactivation applicable to the 5G NR system, and so on.

Thus, in an embodiment of the present disclosure, a network-side device broadcasts first system information directly to a terminal, enabling the terminal in a non-connected state to determine and execute a corresponding measurement operation according to the first system information. Since the terminal in the non-connected state may execute the measurement operation, and report a measurement result for configuring fast activation or deactivation in the non-connected state to the network-side device, therefore the communication performance of the communication system may be improved.

Figure 2:
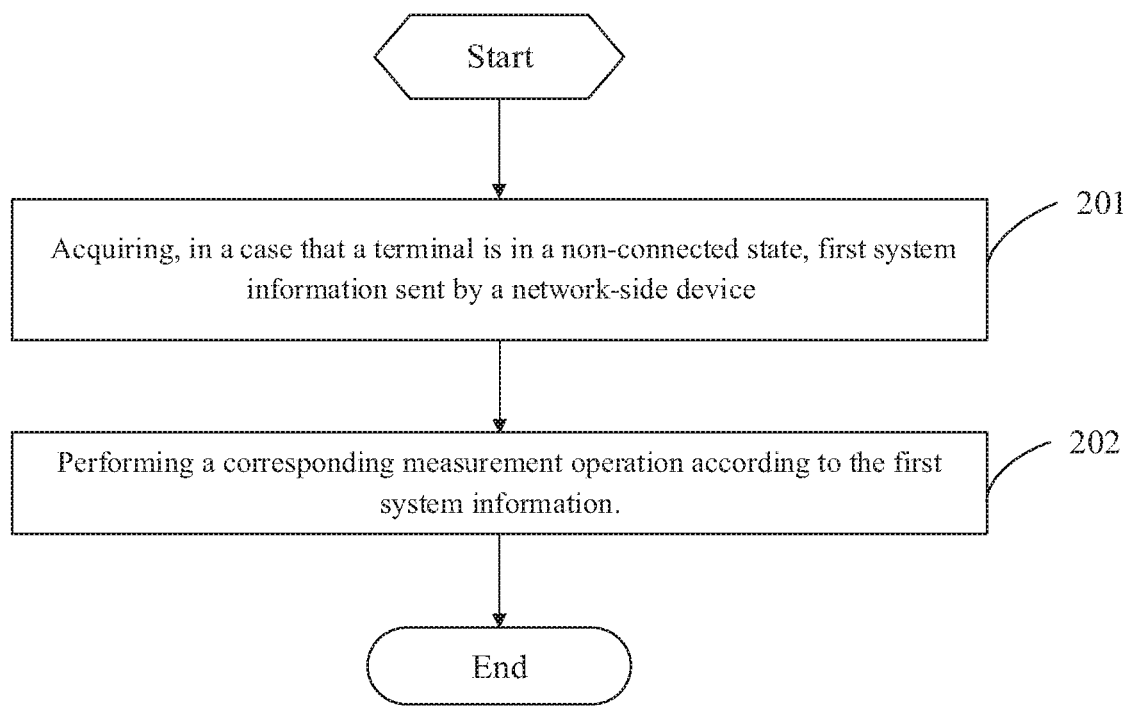
FIG. 2 is a flowchart of a measurement method provided in an embodiment of the present disclosure.

FIG. 2 is a flowchart of a measurement method provided in an embodiment of the present disclosure. As shown in FIG. 2, a measurement method applied to a terminal includes the following steps.

Step 201: acquiring, in a case that the terminal is in a non-connected state, first system information sent by a network-side device.

The first system information is used for at least one of following: indicating whether a cell supports a function of fast activation or deactivation; indicating whether the network-side device broadcasts second system information, where the second system information is used for configuring measurement information of fast activation or deactivation; indicating whether third system information includes measurement information of fast activation or deactivation; and indicating whether the network-side device broadcasts the third system information.

In a 5G NR system, for example, a non-connected state of a terminal may be either the idle state or the inactive state; first system information refers to system information that a network-side device may broadcast directly to the terminal, such as SIB1 or remaining minimum system information (Remaining Minimum System Information, RMSI). Second system information (or third system information) refers to system information that a network-side device does not directly broadcast to the terminal, but is sent based on a request of the terminal, and is used by the network-side device to configure, for the terminal, measurement information of fast activation or deactivation, for example, other system information block types such as SIB5 or SIBX. It is assumed that a SIB including configuration of fast activation or deactivation in the 5G NR system is reused as SIB5 as in the LTE system, that is, SIB5 includes not only measurement information for cell reselection, but also measurement information for configuring fast activation or deactivation; or, it is assumed that the 5G NR system introduces a new SIBX (X is an integer different from 1-22 of SIB type 1 to SIB type 22 in the related art, such as SIB23) to an SIB including configuration of fast activation or deactivation, and the SIBX is different from the SIB5 in the LTE system, the SIBX is only used to configure measurement information of fast activation or deactivation.

The terminal may be understood as a terminal having measurement capability in a non-connected state, and the terminal is performing measurement in the non-connected state in a process that the terminal switches from a network-side device A to a network-side device B until the terminal acquires first system information sent by the network-side device. All the network-side devices involved in embodiments of the present disclosure may be understood as the network-side device B.

Step 202: performing a corresponding measurement operation according to the first system information.

During specific implementation, the terminal may perform a corresponding measurement operation according to content indicated by the first system information. The following embodiments describe in detail corresponding relationship between indication of the first system information and the measurement operation performed by the terminal.

Embodiment 1: the first system information is used to indicate whether a cell supports a function of fast activation or deactivation.

In a case that the first system information (such as SIB1 or RMSI) is used to indicate that a cell does not support the function of fast activation or deactivation, the Step 202 may include at least one of the following; 1) the terminal stops a measurement in the non-connected state; 2) the terminal does not report that there is an available measurement result in the non-connected state in a case that the terminal enters the connected state, or during a process of switching from the non-connected state to the connected state by the terminal.

In the implementation, since the first system information indicates that the cell does not support the function of fast activation or deactivation, the terminal stops a measurement in the non-connected state, and the terminal does not report that there is an available measurement result in the non-connected state in a case that the terminal enters the connected state, or during a process of switching from the non-connected state to the connected state by the terminal.

In a case that the first system information (such as SIB1 or RMSI) is used to indicate that the cell supports the function of fast activation or deactivation, and the first system information is used to indicate that the network-side device does not broadcast the second system information (the second system information refers to system information used by the network-side device to configure measurement information of fast activation or deactivation, such as SIB5 or SIBX), Step 202 may include at least one of the following: 1) stopping measurement performed in the non-connected state; 2) reporting that there is an available measurement result in the non-connected state if there is a measurement result meeting a reporting condition, in a case that the terminal enters the connected state, or during a process of switching from the non-connected state to the connected state by the terminal.

In the implementation, on one hand, although the first system information indicates that the cell supports the function of fast activation or deactivation, the first system information indicates that the network-side device does not broadcast the second system information used for configuring the measurement information of fast activation or deactivation. In this case, the terminal may not actually acquire the measurement information of fast activation or deactivation, and therefore, the terminal may stop the measurement performed in the non-connected state. On the other hand, although the first system information indicates that the cell supports the function of fast activation or deactivation, even if the first system information indicates that the network-side device does not broadcast the second system information used for configuring the measurement information of fast activation or deactivation, the terminal still may report that there is an available measurement result in the non-connected state if there is the available measurement result.

In a case that the first system information (such as SIB1 or RMSI) is used to indicate that the cell supports the function of fast activation or deactivation, and the first system information is used to indicate that the network-side device is broadcasting the second system information (the second system information refers to system information used by the network-side device to configure measurement information of fast activation or deactivation, such as SIB5 or SIBX), Step 202 may include: reading the measurement information for configuring fast activation or deactivation included in the second system information or the third system information; acquiring a frequency point configured in the measurement information; measuring the configured frequency point in the non-connected state.

In the implementation, Step 202 may further include: reporting that there is an available measurement result in the non-connected state if there is a measurement result meeting a reporting condition, in a case that the terminal enters the connected state, or during a process of switching from the non-connected state to the connected state by the terminal.

In the implementation, since the first system information indicates that the cell supports the function of fast activation or deactivation, and the network-side device is broadcasting the second system information used for configuring the measurement information of fast activation or deactivation, the terminal in the non-connected state may perform measurement according to the frequency point configured in the measurement information, after updating the measurement frequency point, and the terminal may also report measurement results that meet reporting conditions to the network-side device. The terminal in the non-connected state performs measurement on the frequency point in advance, this may assist the network-side device to quickly perform configuration of fast activation or deactivation, and may improve communication performance of the communication system.

In the embodiment, through any of the foregoing implementations, the first system information is introduced to indicate whether the cell supports fast activation or deactivation, so that the terminal may performs a corresponding measurement operation and a measurement report operation according to the indication information.

Embodiment 2: the first system information is used to indicate whether third system information includes measurement information of fast activation or deactivation, and the first system information is used to indicate whether the network-side device broadcasts the third system information.

In a case that the first system information (such as SIB1 or RMSI) is used to indicate that the third system information (e.g., SIB5) does not include the measurement information of fast activation or deactivation, Step 202 may include at least one of the following: 1) stopping measurement performed in the non-connected state; 2) not reporting that there is an available measurement result in the non-connected state, in a case that the terminal enters the connected state, or during a process of switching from the non-connected state to the connected state by the terminal.

In the implementation, since the first system information indicates that the third system information does not include measurement information of fast activation or deactivation, the terminal in this case may not actually acquire the measurement information of fast activation or deactivation, and therefore, the terminal may stop the measurement in the non-connected state.

In a case that the first system information (such as SIB1 or RMSI) is used to indicate that the third system information (e.g., SIB5) includes the measurement information of fast activation or deactivation, and the network-side device does not broadcast the third system information, Step 202 may include: sending to the network-side device a request for acquiring the third system information; reading the third system information sent by the network-side; reading the measurement information of fast activation or deactivation included in the third system information; acquiring a frequency point configured in the measurement information; measuring the configured frequency point in the non-connected state.

In the implementation, Step 202 may further include: reporting that there is an available measurement result in the non-connected state if there is a measurement result meeting a reporting condition, in a case that the terminal enters the connected state, or during a process of switching from the non-connected state to the connected state by the terminal.

In the implementation, since the first system information indicates that the third system information includes measurement information of fast activation or deactivation, the terminal may consider that the cell may support the function of fast activation or deactivation. Therefore, even if the first system information indicates that the network-side device does not broadcast the third system information, the terminal may send a request to the network-side device to request the network-side device to broadcast the third system information, so that the terminal in the non-connected state may perform measurement. The terminal in the non-connected state performs measurement on the frequency point in advance, this may assist the network-side device to quickly perform configuration of fast cell activation or deactivation, and may improve communication performance of the communication system.

In a case that the first system information (e.g., SIB1 or RMSI) is used to indicate that the third system information (e.g., SIB5) includes the measurement information of fast activation or deactivation, and the network-side device is broadcasting the third system information, Step 202 may include: reading the third system information sent by the network-side; reading the measurement information of fast activation or deactivation included in the third system information; acquiring a frequency point configured in the measurement information; measuring the configured frequency point in the non-connected state.

In the implementation, Step 202 may further include: reporting that there is an available measurement result in the non-connected state if there is a measurement result meeting a reporting condition, in a case that the terminal enters the connected state, or during a process of switching from the non-connected state to the connected state by the terminal.

In the implementation, since the first system information indicates that the third system information includes measurement information of fast activation or deactivation, and the first system information indicates that the network-side device is broadcasting the third system information, the terminal in the non-connected state may perform measurement according to the frequency point configured in the measurement information after updating the measurement frequency point, and the terminal may also report to the network-side device a measurement result that meets a reporting condition. The terminal in the non-connected state performs measurement on the frequency point in advance, this may assist the network-side device to quickly perform configuration of fast cell activation or deactivation, and may improve communication performance of the communication system.

In the implementation, through any of the foregoing implementation manners, the first system information is introduced to indicate whether the third system information includes measurement information of fast activation or deactivation, and the first system information is used to indicate whether the network-side device broadcasts the third system information, so that the terminal may perform a corresponding measurement operation and a measurement report operation according to the indication information.

Embodiment 3: the first system information is used to indicate whether the network-side device broadcasts second system information, where the second system information is used to configure measurement information of fast activation or deactivation. In the implementation, by using the first system information to indicate whether the network-side device broadcasts the second system information, it may be implicitly indicated whether the cell supports the function of fast activation or deactivation.

In a case that the first system information (such as SIB1 or RMSI) is used to indicate that the network-side device does not broadcast the second system information (e.g., SIBX), Step 202 may include at least one of the following: stopping measurement performed in the non-connected state; not reporting that there is an available measurement result in the non-connected state in a case that the terminal enters the connected state, or during a process of switching from the non-connected state to the connected state by the terminal.

In the implementation, since the first system information indicates that the network-side device does not broadcast the second system information, the terminal may know that the cell does not support the function of fast activation or deactivation. In this way, the terminal stops a measurement in the non-connected state, and the terminal does not report that there is an available measurement result in the non-connected state in a case that the terminal enters the connected state, or during a process of switching from the non-connected state to the connected state by the terminal.

In a case that the first system information (such as SIB1 or RMSI) is used to indicate that the network-side device is broadcasting the second system information (e.g., SIBX), Step 202 may include: reading a frequency point configured in the second system information; measuring the configured frequency point in the non-connected state.

In the implementation, Step 202 may further include: reporting that there is an available measurement result in the non-connected state if there is a measurement result meeting a reporting condition, in a case that the terminal enters the connected state or during a process of switching from the non-connected state to the connected state by the terminal.

In the implementation, since the first system information indicates that the network-side device is broadcasting the second system information, the terminal may know that the cell supports the function of fast activation or deactivation. In this way, the terminal in the non-connected state may perform measurement according to the frequency point configured in the measurement information after updating the measurement frequency point, and the terminal may also report a measurement result that meet a reporting condition to the network-side device. The terminal in the non-connected state performs measurement on the frequency point in advance, which may assist the network-side device to quickly perform configuration of fast activation or deactivation, and may improve communication performance of the communication system.

In the implementation, through any of the foregoing implementation manners, the first system information is introduced to indicate whether the network-side device broadcasts the second system information, so that the terminal may perform a corresponding measurement operation and a measurement report operation according to the indication information.

Thus, in embodiments of the present disclosure, a network-side device broadcasts first system information directly to a terminal, thereby enabling the terminal in a non-connected state to determine and perform a corresponding measurement operation according to the first system information. Since the terminal in the non-connected state may perform the measurement operation, a delay caused by switching between the non-connected state and the connected state of the terminal may be reduced, therefore the communication performance of the communication system may be improved.

Figure 3:
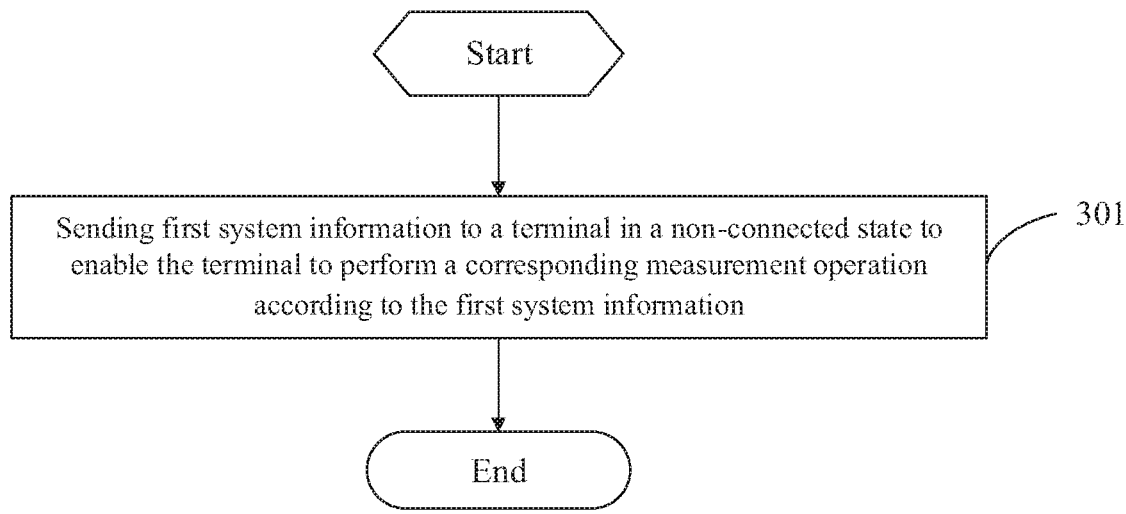
FIG. 3 is another flowchart of a measurement method provided in an embodiment of the present disclosure.

FIG. 3 is another flowchart of a measurement method provided in an embodiment of the present disclosure. As shown in FIG. 3, a measurement method applied to a network-side device includes the following step 301.

Step 301: sending first system information to a terminal in a non-connected state to enable the terminal to perform a corresponding measurement operation according to the first system information.

The first system information is used for at least one of: indicating whether a cell supports a function of fast activation or deactivation; indicating whether the network-side device broadcasts second system information, where the second system information is used to configure measurement information of fast activation or deactivation; indicating whether third system information includes measurement information of fast activation or deactivation, and indicating whether the network-side device broadcasts the third system information.

Optionally, the method further includes: receiving, in a case that the terminal has a measurement result meeting a reporting condition, the measurement result reported by the terminal.

Optionally, the method further includes: sending the second system information to the terminal.

Optionally, the method further includes: receiving a request for acquiring the third system information sent by the terminal; sending the third system information to the terminal.

Optionally, the non-connected state includes an idle state or an inactive state; the first system information includes a system information block type 1 (SIB1) or a remaining minimum system information (RMSI); the second system information includes a system information block type 5 (SIB5) or other system information block type; the third system information includes an SIB5 or other system information block type.

Optionally, the terminal is a terminal having a measurement capability in the non-connected state, and the terminal is performing measurement in the non-connected state before the terminal acquires the first system information sent by the network-side device.

It should be noted that, the embodiment of the present disclosure serves as an embodiment of a network-side device corresponding to the embodiment shown in FIG. 2. For specific implementation manners, reference may be made to the relevant description of the embodiment shown in FIG. 2, the same beneficial effects are achieved, which is not detailed herein again to avoid repetition.

Figure 4:
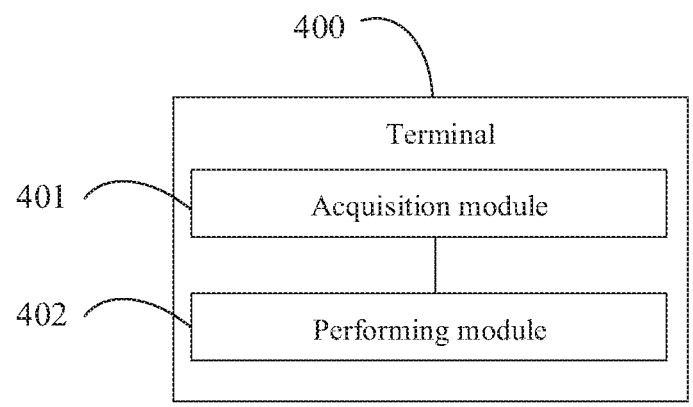
FIG. 4 is a structural diagram of a terminal provided in an embodiment of the present disclosure.

FIG. 4 is a structural diagram of a terminal provided in an embodiment of the present disclosure. As shown in FIG. 4, the terminal 400 includes: an acquisition module 401, used to acquire first system information sent by a network-side device in a case that the terminal is in a non-connected state; a performing module 402, used to perform a corresponding measurement operation according to the first system information; wherein the first system information is used for at least one of: indicating whether a cell supports a function of fast activation or deactivation; indicating whether the network-side device broadcasts second system information, where the second system information is used to configure measurement information of fast activation or deactivation; indicating whether third system information includes measurement information of fast activation or deactivation, and indicating whether the network-side device broadcasts the third system information.

Optionally, the performing module 402 is specifically used to at least one of: stopping measurement performed in the non-connected state; not reporting that there is an available measurement result in the non-connected state in a case that the terminal enters the connected state, or during a process of switching from the non-connected state to the connected state by the terminal; reporting that there is an available measurement result in the non-connected state if there is a measurement result meeting a reporting condition in a case that the terminal enters the connected state, or during a process of switching from the non-connected state to the connected state by the terminal.

Optionally, the first system information is used to indicate that the cell supports the function of fast activation or deactivation, and the first system information is used to indicate that the network-side device is broadcasting the second system information;

The performing module 402 is specifically used to: read the measurement information of fast activation deactivation included in the second system information; acquire a frequency point configured in the measurement information; measure the configured frequency point in the non-connected state.

Optionally, the first system information is used to indicate that the third system information includes the measurement information of fast activation or deactivation, and the network-side device does not broadcast the third system information. The performing module 402 is specifically used to: send a request for acquiring the third system information to the network-side device; read the third system information sent by the network-side; read the measurement information of fast activation or deactivation included in the third system information; acquire a frequency point configured in the measurement information; measure the configured frequency point in the non-connected state.

Optionally, the first system information is used to indicate that the third system information includes the measurement information of fast activation or deactivation, and the network-side device is broadcasting the third system information. The performing module 402 is specifically used to: read the third system information sent by the network-side; read the measurement information of fast activation or deactivation included in the third system information; acquire a frequency point configured in the measurement information; measure the configured frequency point in the non-connected state.

Optionally, the first system information is used to indicate that the network-side device is broadcasting the second system information. The performing module 402 is specifically used to: read a frequency point configured in the second system information; measure the configured frequency point in the non-connected state.

Optionally, the non-connected state includes an idle state or an inactive state;

The first system information includes a system information block type 1 (SIB1) or a remaining minimum system information (RMSI); the second system information includes a system information block type 5 (SIB5) or other system information block type; the third system information includes an SIB5 or other system information block type.

Optionally, the terminal is a terminal with measurement capability in the non-connected state, and the terminal is performing measurement in the non-connected state before the terminal acquires the first system information sent by the network-side device.

It should be noted that, in an embodiment of the present disclosure, the terminal 400 may be a terminal in any of the method embodiments, and any implementation of the terminal in the method embodiments of the present disclosure may be implemented by the terminal 400 in the embodiments of the present disclosure, the same beneficial effects are achieved, and which is not detailed herein again to avoid repetition.

Figure 5:
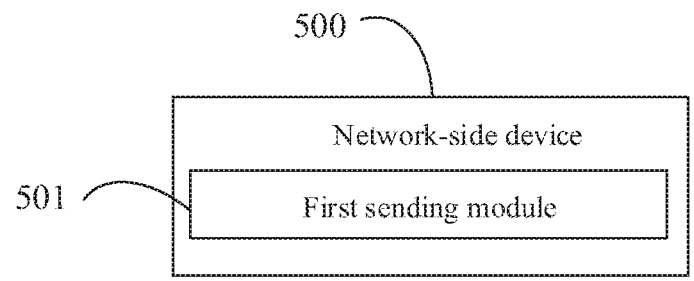
FIG. 5 is a structural diagram of a network-side device provided in an embodiment of the present disclosure.

Referring to FIG. 5, FIG. 5 is a structural diagram of a network-side device provided in an embodiment of the present disclosure. As shown in FIG. 5, the network-side device 500 includes: a first sending module 501, used to send first system information to a terminal in a non-connected state to enable the terminal to perform a corresponding measurement operation according to the first system information; wherein the first system information is used for at least one of: indicating whether a cell supports a function of fast activation or deactivation; indicating whether the network-side device broadcasts second system information, where the second system information is used to configure measurement information of fast activation or deactivation; indicating whether third system information includes measurement information of fast activation or deactivation, and indicating whether the network-side device broadcasts the third system information.

Figure 6:
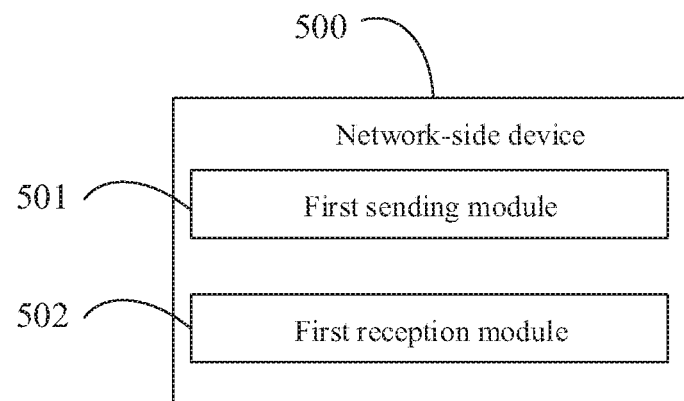
FIG. 6 is another structural diagram of a network-side device provided in an embodiment of the present disclosure.

Optionally, as shown in FIG. 6, the network-side device 500 further includes: a first reception module 502, used to receive, in a case that the terminal has a measurement result meeting a reporting condition, the measurement result reported by the terminal.

Figure 7:
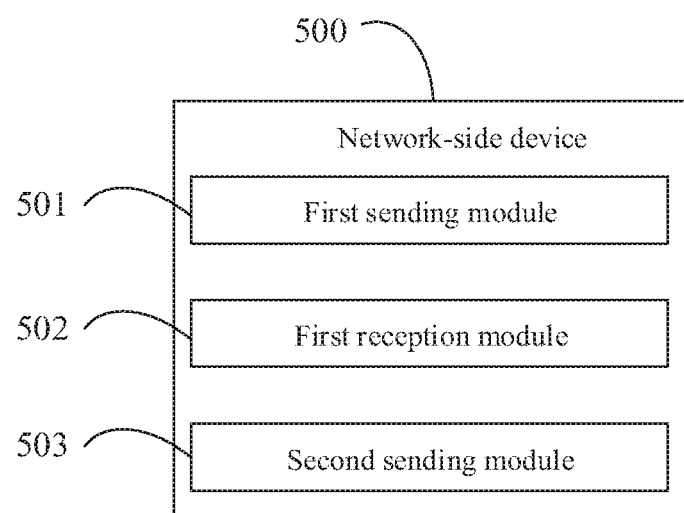
FIG. 7 is still another structural diagram of a network-side device provided in an embodiment of the present disclosure.

Optionally, as shown in FIG. 7, the network-side device 500 further includes: a second sending module 503, used to send the second system information to the terminal.

Figure 8:
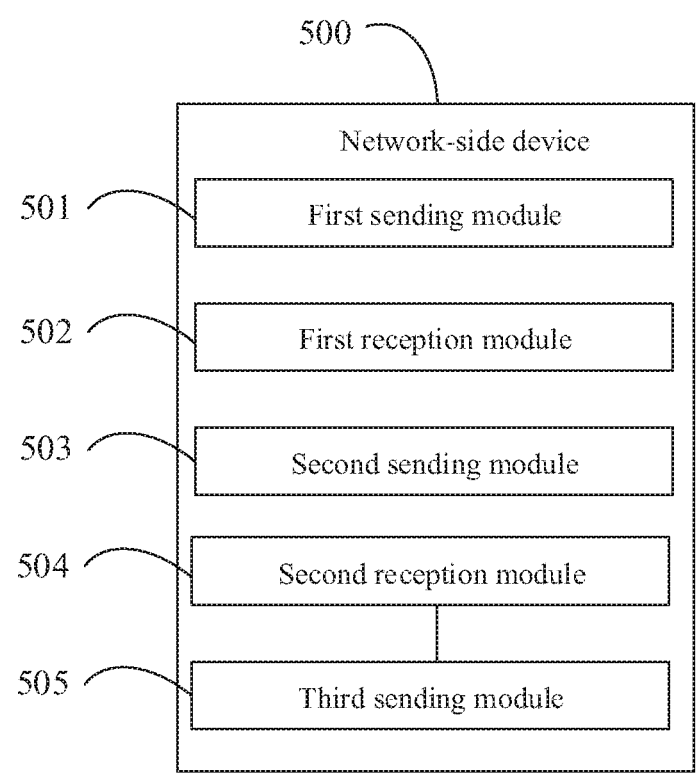
FIG. 8 is yet another structural diagram of a network-side device provided in an embodiment of the present disclosure.

Optionally, as shown in FIG. 8, the network-side device 500 further includes: a second reception module 504, used to receive a request for acquiring the third system information sent by the terminal; a third sending module 505, used to send the third system information to the terminal.

Optionally, the non-connected state includes an idle state or an inactive state. The first system information includes a system information block type 1 (SIB1) or a remaining minimum system information (RMSI); the second system information includes a system information block type 5 (SIB5) or other system information block type; the third system information includes an SIB5 or other system information block type.

Optionally, the terminal is a terminal with measurement capability in the non-connected state, and the terminal is performing measurement in the non-connected state before the terminal acquires the first system information sent by the network-side device.

It should be noted that, in an embodiment of the present disclosure, the network-side device 500 may be a network-side device in any of the method embodiments, and any implementation of the network-side device in the method embodiments of the present disclosure may be implemented by the network-side device 500 in the embodiments of the present disclosure, the same beneficial effects are achieved, thus detailed description thereof is not provided herein to avoid repetition.

Figure 9:
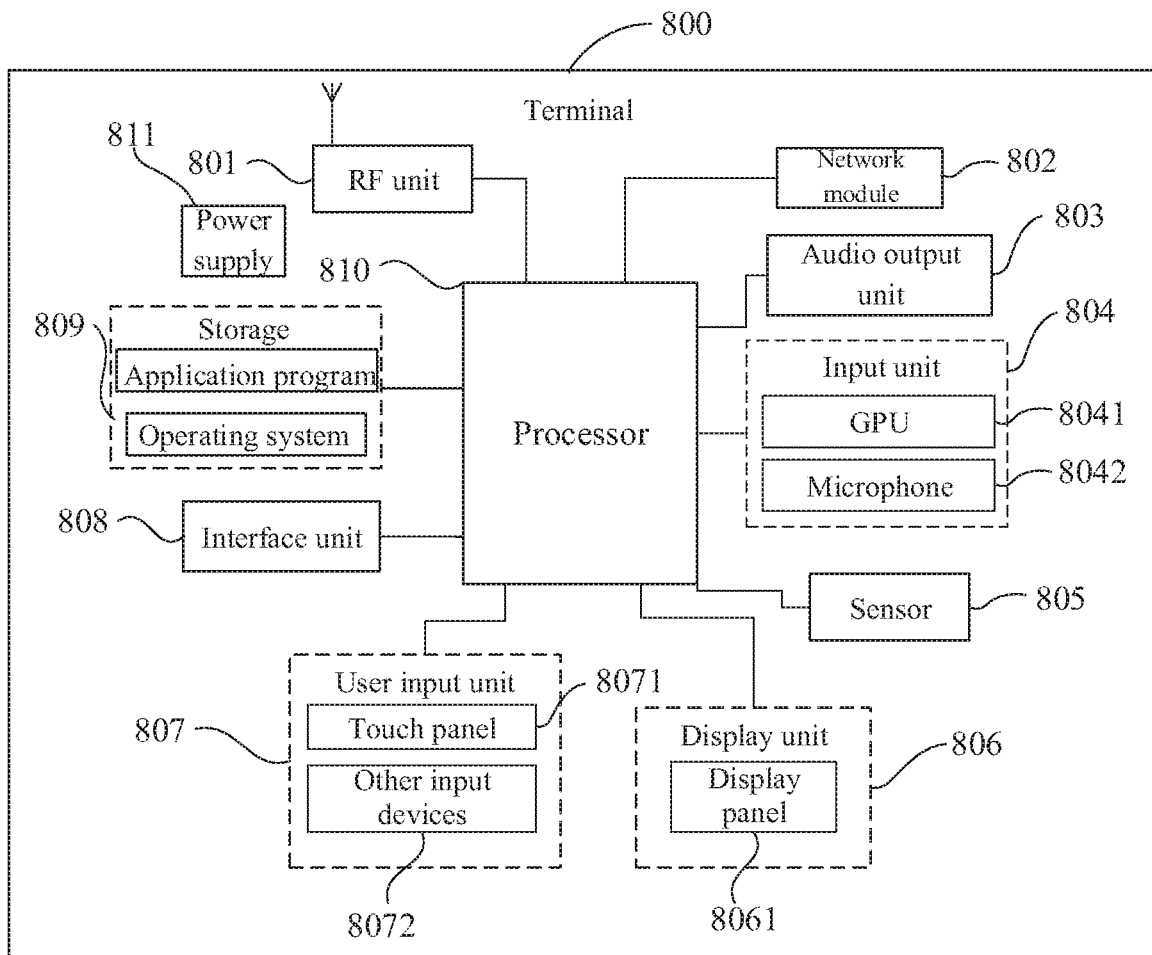
FIG. 9 is a schematic diagram of a hardware structure of a terminal provided in an embodiment of the present disclosure.
Figure 10:
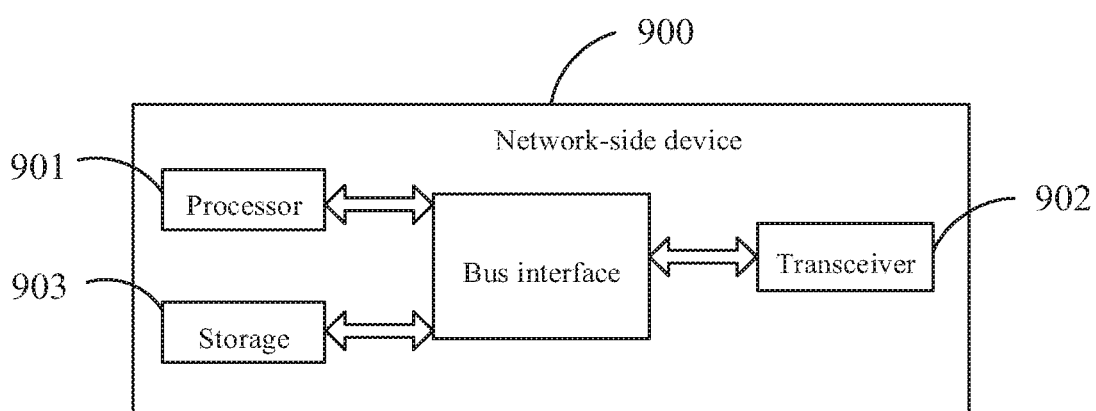
FIG. 10 is another schematic diagram of a hardware structure of a network-side device provided in an embodiment of the present disclosure.

Specifically, FIG. 9 is a schematic diagram of a hardware structure of a terminal that implements various embodiments of the present disclosure. A terminal 800 includes, but is not limited to, a radio frequency unit 801, a network module 802, and an audio output unit 803, an input unit 804, a sensor 805, a display unit 806, a user input unit 807, an interface unit 808, a storage 809, a processor 810, and a power supply 811 and other components. Those skilled in the art may understand that the structure of the UE shown in FIG. 8 does not constitute a limitation on the UE, and the terminal may include more or fewer components than shown in the figure, or some combined components, or different arrangements of components. In the embodiment of the present disclosure, the terminal includes, but is not limited to, a mobile phone, a tablet computer, a notebook computer, a palmtop computer, a car terminal, a wearable device, a pedometer, and the like.

The processor 810 is used for: acquiring first system information sent by a network-side device in a case that the terminal is in a non-connected state; performing a corresponding measurement operation according to the first system information. The first system information is used for at least one of: indicating whether a cell supports a function of fast activation or deactivation; indicating whether the network-side device broadcasts second system information, where the second system information is used to configure measurement information of fast activation or deactivation; indicating whether third system information includes measurement information of fast activation or deactivation, and indicating whether the network-side device broadcasts the third system information.

Optionally, the first system information is used to indicate that the cell does not support the function of fast activation or deactivation. The step of performing the corresponding measurement operation according to the first system information performed by the processor 810 further includes at least one of: stopping measurement performed in the non-connected state; not reporting that there is an available measurement result in the non-connected state in a case that the terminal enters the connected state, or during a process of switching from the non-connected state to the connected state by the terminal.

Optionally, the first system information is used to indicate that the cell supports the function of fast activation or deactivation, and the first system information is used to indicate that the network-side device does not broadcast the second system information. The step of performing the corresponding measurement operation according to the first system information performed by the processor 810 further includes at least one of: stopping measurement performed in the non-connected state; reporting that there is an available measurement result in the non-connected state if there is a measurement result meeting a reporting condition in a case that the terminal enters the connected state, or during a process of switching from the non-connected state to the connected state by the terminal.

Optionally, the first system information is used to indicate that the cell supports the function of fast activation or deactivation, and the first system information is used to indicate that the network-side device is broadcasting the second system information. The step of performing the corresponding measurement operation according to the first system information performed by the processor 810 further includes: reading the measurement information of fast activation or deactivation included in the second system information; acquiring a frequency point configured in the measurement information; measuring the configured frequency point in the non-connected state.

Optionally, the step of performing the corresponding measurement operation according to the first system information performed by the processor 810 further includes: reporting that there is an available measurement result in the non-connected state if there is a measurement result meeting a reporting condition in a case that the terminal enters the connected state, or during a process of switching from the non-connected state to the connected state by the terminal.

Optionally, the first system information is used to indicate that the third system information does not include the measurement information of fast activation or deactivation. The step of performing the corresponding measurement operation according to the first system information performed by the processor 810 further includes at least one of: stopping measurement performed in the non-connected state; not reporting that there is an available measurement result in the non-connected state in a case that the terminal enters the connected state, or during a process of switching from the non-connected state to the connected state by the terminal. Optionally, the first system information is used to indicate that the third system information includes the measurement information of fast activation or deactivation, and the network-side device does not broadcast the third system information. The step of performing the corresponding measurement operation according to the first system information performed by the processor 810 further includes: sending a request for acquiring the third system information to the network-side device; reading the third system information sent by the network-side; reading the measurement information of fast activation or deactivation included in the third system information; acquiring a frequency point configured in the measurement information; measuring the configured frequency point in the non-connected state.

Optionally, the first system information is used to indicate that the third system information includes the measurement information fast activation or deactivation and the network-side device is broadcasting the third system information. The step of performing the corresponding measurement operation according to the first system information performed by the processor 810 further includes: reading the third system information sent by the network-side; reading the measurement information of fast activation or deactivation included in the third system information; acquiring a frequency point configured in the measurement information; measuring the configured frequency point in the non-connected state.

Optionally, the step of performing the corresponding measurement operation according to the first system information performed by the processor 810 further includes: reporting that there is an available measurement result in the non-connected state if there is a measurement result meeting a reporting condition in a case that the terminal enters the connected state, or during a process of switching from the non-connected state to the connected state by the terminal.

Optionally, the first system information is used to indicate that the network-side device does not broadcast the second system information. The step of performing the corresponding measurement operation according to the first system information performed by the processor 810 further includes: stopping measurement performed in the non-connected state; not reporting that there is an available measurement result in the non-connected state in a case that the terminal enters the connected state, or during a process of switching from the non-connected state to the connected state by the terminal.

Optionally, the first system information is used to indicate that the network-side device is broadcasting the second system information. The step of performing the corresponding measurement operation according to the first system information performed by the processor 810 further includes: reading a frequency point configured in the second system information; measuring the configured frequency point in the non-connected state.

Optionally, the step of performing the corresponding measurement operation according to the first system information performed by the processor 810 further includes: reporting that there is an available measurement result in the non-connected state if there is a measurement result meeting a reporting condition in a case that the terminal enters the connected state, or during a process of switching from the non-connected state to the connected state by the terminal.

Optionally, the non-connected state includes an idle state or an inactive state.

The first system information includes a system information block type 1 (SIB1) or a remaining minimum system information (RMSI); the second system information includes a system information block type 5 (SIB5) or other system information block type; the third system information includes an SIB5 or other system information block type.

Optionally, the terminal is a terminal having measurement capability in the non-connected state, and the terminal is performing measurement in the non-connected state before the terminal acquires the first system information sent by the network-side device.

In the embodiment of the present disclosure, a network-side device broadcasts first system information directly to a terminal, enabling the terminal in a non-connected state to determine and perform a corresponding measurement operation according to the first system information. Since the terminal in the non-connected state may perform the measurement operation, and report to the network-side device a measurement result for configuring fast activation or deactivation in the non-connected state, therefore the communication performance of the communication system may be improved.

It should be understood that, in the embodiments of the present disclosure, the radio frequency unit 801 may be used to receive and send information or send and receive signals during a call. Specifically, downlink data from a base station is received and processed by the processor 810; in addition, uplink data is sent to the base station. Generally, the radio frequency unit 801 includes, but is not limited to, an antenna, at least one amplifier, a transceiver, a coupler, a low-noise amplifier, a duplexer, and the like. In addition, the radio frequency unit 801 may also communicate with a network and other devices through a wireless communication system.

The terminal provides users with wireless broadband Internet access through the network module 802, such as helping users to send and receive email, to browse web pages, and to access streaming media, etc.

The audio output unit 803 may convert audio data received by the radio frequency unit 801 or the network module 802 or stored in the storage 809 into audio signals and output the audio signal as sound. Moreover, the audio output unit 803 may also provide audio output (for example, a call signal reception sound, a message reception sound, etc.) related to a specific function performed by the terminal 800. The audio output unit 803 includes a speaker, a buzzer, a receiver, and the like.

The input unit 804 is used to receive audio signals or video signals. The input unit 804 may include a graphics processing unit (Graphics Processing Unit, GPU) 8041 and a microphone 8042, and the graphics processing unit 8041 processes image data of a still picture or video obtained by an image capture device (such as a camera) in a video capture mode or an image capture mode. The processed image frames may be displayed on the display unit 806. The image frames processed by the graphics processing unit 8041 may be stored in the storage 809 (or other storage medium) or transmitted via the radio frequency unit 801 or the network module 802. The microphone 8042 may receive sound, and may process such sound into audio data. The processed audio data may be converted into an output format that may be transmitted to a mobile communication base station via the radio frequency unit 801 in the case of a telephone call mode.

The terminal 800 further includes at least one sensor 805, such as a light sensor, a motion sensor, and other sensors. Specifically, the light sensor includes an ambient light sensor and a proximity sensor, where the ambient light sensor may adjust brightness of a display panel 8061 according to brightness of the ambient light, and the proximity sensor may turn off the display panel 8061 and backlight in a case that the terminal 800 is moved to an ear. As a type of the motion sensor, an accelerometer sensor may detect a magnitude of acceleration in various directions (usually three axes), and detect a magnitude and direction of gravity in the case of stationary, and be used to identify attitude of the terminal (such as horizontal and vertical screen switching, related games, magnetometer attitude calibration), vibration recognition related functions (such as pedometer, tap), etc.; the sensor 805 may also include a fingerprint sensor, a pressure sensor, an iris sensor, a molecular sensor, a gyroscope, a barometer, a hygrometer, a thermometer, an infrared sensor and the like, which are not repeated here.

The display unit 806 may be used to display information inputted by the user or information provided to the user. The display unit 806 may include the display panel 8061, and the display panel 8061 may be configured as a form of a liquid crystal display (Liquid Crystal Display, LCD), an organic light-emitting diode (Organic Light-Emitting Diode, OLED) or the like.

The user input unit 807 may be used to receive numeric information or character information inputted by a user and generate a signal input related to user's settings and related to a function control of the terminal. Specifically, the user input unit 807 includes a touch panel 8071 and other input devices 8072. The touch panel 8071, also referred to as a touch screen, may collect the user's touch operations thereon or nearby (such as the user's operation on the touch panel 8071 or near the touch panel 8071 using any suitable object or accessory such as a finger or a stylus). The touch panel 8071 may include two parts, namely a touch detection device and a touch controller. The touch detection device detects a touch orientation of the user, and detects a signal generated by the touch operation, and transmits the signal to the touch controller; the touch controller receives touch information from the touch detection device, converts the touch information into a coordinate of a touch point, transmits the coordinate to the processor 810, and may receive and execute a command from the processor 810. In addition, the touch panel 8071 can be implemented in various types such as resistive, capacitive, infrared, and surface acoustic waves, etc. Besides the touch panel 8071, the user input unit 807 may further include other input devices 8072. Specifically, the other input devices 8072 may include, but are not limited to, a physical keyboard, a function button (such as a volume control button, a switch button, etc.), a trackball, a mouse, and a joystick, and details thereof are not described herein again.

Further, the touch panel 8071 may be overlaid on the display panel 8061, in a case that the touch screen 8071 detects a touch operation thereon or nearby, the touch operation is transmitted to the processor 810 to determine the type of the touch event, then the processor 810 provides a corresponding visual output on the display screen 8061 based on the type of the touch event. Although in FIG. 8, the touch panel 8071 and the display panel 8061 are implemented as two independent components to implement input and output functions of the terminal, in some embodiments, the touch panel 8071 and the display panel 8061 may be integrated to implement the input and output functions of the terminal, which are not limited here.

The interface unit 808 is an interface through which an external device is connected to the terminal 800. For example, the external device may include a wired or wireless headset port, an external power supply (or battery charger) port, a wired or wireless data port, a storage card port, a port for connecting a device with an identification module, and an audio input/output (I/O) port, a video I/O port, or a headphone port, etc. The interface unit 808 may be used to receive input (e.g., data information, power, etc.) from the external device and transmit the received input to one or more elements within the terminal 800 or may be used to transmit data between the terminal 800 and the external device.

The storage 809 may be used to store software programs and various data. The storage 809 may mainly include a storage program area and a storage data area, where the storage program area may store an operating system, an application program (such as a sound playback function, an image playback function, etc.) required for at least one function, and the like; the storage data area may store data (such as audio data, a phone book, etc.) created based on the use of a mobile phone and the like. In addition, the storage 809 may include a high-speed random access storage, and may further include a non-volatile/non-transitory storage, such as at least one magnetic disk storage device, a flash memory device, or other volatile solid-state storage device.

The processor 810 is a control center of the terminal, and uses various interfaces and lines to connect various parts of the entire terminal. By running or executing software programs and modules stored in the storage 809 and calling data stored in the storage 809, various functions of the terminal and processing data are performed, so that the overall monitoring of the terminal is performed. The processor 810 may include one or more processing units; optionally, the processor 810 may integrate an application processor and a modem processor, where the application processor mainly processes an operating system, a user interface, and an application program, etc.

The modem processor mainly handles wireless communication. It could be understood that the modem processor may not be integrated into the processor 810.

The terminal 800 may further include a power source 811 (such as a battery) for supplying power to various components. Optionally, the power supply 811 may be logically connected to the processor 810 through a power management system, so as to implement functions such as management of charging, management of discharging, and power consumption management through the power management system.

In addition, the terminal 800 includes some functional modules that are not shown, and details are not described herein again.

Optionally, an embodiment of the present disclosure further provides a terminal, and the terminal includes: a processor 810, a storage 809, and a computer program stored in the storage 809 and executable by the processor 810, wherein when the computer program is used to executed by the processor 810, the processor 810 implements various processes in the method embodiments of the measurement method, and the same technical effect may be achieved, which will not be repeated herein to avoid repetition.

Referring FIG. 9, FIG. 9 is another structural diagram of a network-side device provided in the embodiments of the present disclosure. As shown in FIG. 9, the network-side device 900 includes: a processor 901, a transceiver 902, a storage 903 and a bus interface.

The transceiver 902 is used to: send first system information to a terminal in a non-connected state to enable the terminal to perform a corresponding measurement operation according to the first system information; receive, in a case that the terminal has a measurement result meeting a reporting condition, the measurement result reported by the terminal.

The first system information is used for at least one of: indicating whether a cell supports a function of fast activation or deactivation; indicating whether the network-side device broadcasts second system information, where the second system information is used to configure measurement information of fast activation or deactivation; indicating whether third system information includes measurement information of fast activation or deactivation, and indicating whether the network-side device broadcasts the third system information.

Optionally, the transceiver 902 is further used to send the second system information to the terminal.

Optionally, the transceiver 902 is further used to receive a request for acquiring the third system information sent by the terminal; sending the third system information to the terminal.

In FIG. 9, a bus architecture may include any number of interconnected buses and bridges. Various circuits, specifically, one or more processors represented by the processor 901 and a storage represented by the storage 903, are linked together. The bus architecture may also link various other circuits such as peripherals, voltage regulators and power management circuits, which are well known in the art, and therefore a further description thereof is omitted herein. The bus interface provides interfaces. The transceiver 902 may be a plurality of elements, that is, includes a transmitter and a receiver, to provide units used to communicate with various other apparatuses over a transmission medium. For different user equipments, the user interface 904 can also be an interface capable of externally/internally connecting the required devices which including but not limited to a keypad, a display, a speaker, a microphone, a joystick, and the like.

The processor 901 is responsible for managing the bus architecture and general processing, and the storage 903 can store data used by the processor 901 when performing operations.

It should be noted that the network-side device 900 in the embodiment may be a network-side device in any of the method embodiments of the present disclosure, and any implementation of the network-side device in the method embodiments in the present disclosure may be implemented by the network-side device 900 in the present embodiment, the same beneficial effects are achieved, and detailed description thereof is not repeated herein again.

The embodiments of the present disclosure also provide a computer readable storage medium, a computer program is stored on the computer readable storage medium. When the computer program is executed by a processor, the processor implements various processes in the embodiments corresponding to a measurement method applied to a network-side devices or a terminal, and the same technical effect may be achieved, which will not be repeated herein to avoid repetition. The computer readable storage medium may be, for example, a read-only memory (Read-Only Memory, ROM), a random access memory (Random Access Memory, RAM), a magnetic disk or an optical disk, etc.

It should be noted that, such terms as "including" or "having" or any other variations thereof herein are intended to encompass a non-exclusive inclusion, such that a process, method, article, or device that includes a plurality of elements includes not only those elements but also other elements not explicitly listed, or elements that are inherent to such a process, method, article, or device. An element after the phrase "comprising a . . . " does not exclude presence of additional identical elements in the process, method, article, or device that comprises the element, if without further limitation.

Through the description of the foregoing embodiments, it is clear to those skilled in the art that the foregoing method embodiments may be implemented by software plus a necessary general hardware platform, and certainly may also be implemented by hardware, but in many cases, the former is a better implementation. Based upon such understanding, the technical solutions of the present disclosure essentially or a part thereof contributing to the prior art may be embodied in the form of a computer software product which may be stored in a storage medium (e.g., a ROM/RAM, a magnetic disk or an optical disk) and which includes several instructions to cause a terminal (which may be a personal computer, a server, an air-conditioner or a network device, etc.) to perform the methods described in the various embodiments of the present disclosure.

The aforementioned are merely specific implementations of the present disclosure, but the protection scope of the present disclosure is by no means limited thereto. Any modifications or substitutions that would easily occurred to those skilled in the art within the technical scope disclosed in the present disclosure should be encompassed in the protection scope of the present disclosure. Therefore, the protection scope of the present disclosure is to be determined by the protection scope of the claims.

What is claimed is:

1. A measurement method, applied to a terminal, the method comprising:

acquiring first system information sent by a network-side device in a case that the terminal is in a non-connected state;
  performing a corresponding measurement operation according to contents of the first system information;
  wherein,
  the first system information is used to indicate that second system information comprises measurement information of fast activation or deactivation, and indicate that the network-side device does not broadcasts the second system information, the first system information comprises a system information block type 1 (SIB1) or remaining minimum system information (RMSI),
  performing the corresponding measurement operation according to the contents of the second system information comprises:
    sending, to the network-side device, a request for acquiring the second system information;
    reading the second system information sent by the network-side;
    reading the measurement information of fast activation or deactivation comprised in the second system information;
    acquiring a frequency point configured in the measurement information;
    measuring the configured frequency point in the non-connected state;
  or,
  the first system information is used to indicate that second system information comprises measurement information of fast activation or deactivation, and indicate that the network-side device is broadcasting the second system information, the first system information comprises a system information block type 1 (SIB1) or remaining minimum system information (RMSI),
  performing the corresponding measurement operation according to the contents of the first system information comprises:
    reading the second system information sent by the network-side;
    reading the measurement information of fast activation or deactivation comprised in the second system information;
    acquiring a frequency point configured in the measurement information;
    measuring the configured frequency point the non-connected state.

2. The method according to claim 1, wherein, in case that the first system information is used to indicate that the second system information comprises the measurement information of fast activation or deactivation, and indicate that the network-side device does not broadcast the second system information, performing the corresponding measurement operation according to the contents of the first system information further comprises:
  reporting that there is an available measurement result in the non-connected state if there is a measurement result meeting a reporting condition, in a case that the terminal enters a connected state or during a process of switching from the non-connected state to a connected state by the terminal.

3. The method according to claim 1, wherein the non-connected state comprises an idle state or an inactive state;
  the second system information comprises a system information block type 5 (SIB5) or other system information block type.

4. The method according to claim 1, wherein the terminal is a terminal having measurement capability in the non-connected state, and the terminal is performing measurement in the non-connected state before the terminal acquires the first system information sent by the network-side device.

5. A terminal, comprising:
a storage, a processor, and a computer program stored on the storage and executable by the processor, wherein in a case that the computer program is executed by the processor, the processor implements steps of the measurement method according to claim 1.

6. The terminal according to claim 5, wherein, in case that the first system information is used to indicate that the second system information comprises the measurement information of fast activation or deactivation, and indicate that the network-side device does not broadcast the second system information, performing the corresponding measurement operation according to the contents of the first system information further comprises:
reporting that there is an available measurement result in the non-connected state if there is a measurement result meeting a reporting condition, in a case that the terminal enters a connected state or during a process of switching from the non-connected state to a connected state by the terminal.

7. The terminal according to claim 5, wherein the non-connected state comprises an idle state or an inactive state; the second system information comprises an SIB5 or other system information block type.

8. The terminal according to claim 5, wherein the terminal is a terminal having measurement capability in the non-connected state, and the terminal is performing measurement in the non-connected state before the terminal acquires the first system information sent by the network-side device.

9. A measurement method, applied to a network-side device, the method comprising:
sending first system information to a terminal in a non-connected state, to enable the terminal to perform a corresponding measurement operation according to contents of the first system information;
wherein,
the first system information is used to indicate whether that second system information comprises measurement information of fast activation or deactivation, and indicate that the network-side device does not broadcasts the second system information, the first system information comprises a system information block type 1 (SIB1) or remaining minimum system information (RMSI),
to perform the corresponding measurement operation according to the contents of the first system information comprises:
sending, to the network-side device, a request for acquiring the second system information;
reading the second system information sent by the network-side;
reading the measurement information of fast activation or deactivation comprised in the second system information;
acquiring a frequency point configured in the measurement information;
measuring the configured frequency point in the non-connected state;
or,
the first system information is used to indicate that second system information comprises measurement information of fast activation or deactivation, and indicate that the network-side device is broadcasting the second system information, the first system information comprises a system information block type 1 (SIB1) or remaining minimum system information (RMSI),
to perform the corresponding measurement operation according to the contents of the first system information comprises:
reading the second system information sent by the network-side;
reading the measurement information of fast activation or deactivation comprised in the second system information;
acquiring a frequency point configured in the measurement information;
measuring the configured frequency point in the non-connected state.

10. The method according to claim 9, further comprising:
receiving, in a case that the terminal has a measurement result meeting a reporting condition, the measurement result reported by the terminal.

11. The method according to claim 9, further comprising:
receiving a request for acquiring the second system information sent by the terminal;
sending the second system information to the terminal.

12. The method according to claim 9, wherein the non-connected state comprises an idle state or an inactive state;
the second system information comprises an SIB5 or other system information block type; and/or,
the terminal is a terminal having measurement capability in the non-connected state, and the terminal is performing measurement in the non-connected state before the terminal acquires the first system information sent by the network-side device.

13. A network-side device, comprising:
a storage, a processor, and a computer program stored on the storage and executable by the processor, wherein in a case that the computer program is executed by the processor, the processor implements steps of the measurement method according to claim 9.

14. The network-side device according to claim 13, wherein in a case that the computer program is executed by the processor, the processor further implements:
receiving, in a case that the terminal has a measurement result meeting a reporting condition, the measurement result reported by the terminal.

15. The network-side device according to claim 13, wherein in a case that the computer program is executed by the processor, the processor further implements:
receiving a request for acquiring the second system information sent by the terminal;
sending the second system information to the terminal.

16. The network-side device according to claim 13, wherein the non-connected state comprises an idle state or an inactive state;
the second system information comprises an SIB5 or other system information block type; and/or,
the terminal is a terminal having measurement capability in the non-connected state, and the terminal is performing measurement in the non-connected state before the terminal acquires the first system information sent by the network-side device.

* * * * *